(12) United States Patent
Cockburn et al.

(10) Patent No.: US 8,352,932 B2
(45) Date of Patent: Jan. 8, 2013

(54) SYNCHRONIZING CONTROLLER FIRMWARE DOWNLOAD

(75) Inventors: Gordon J. Cockburn, Southampton (GB); David James Medhurst, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 1321 days.

(21) Appl. No.: 11/934,663

(22) Filed: Nov. 2, 2007

(65) Prior Publication Data

US 2008/0127166 A1 May 29, 2008

(30) Foreign Application Priority Data

Nov. 29, 2006 (GB) .................................. 0623933.9

(51) Int. Cl.
*G06F 9/44* (2006.01)
*G06F 9/445* (2006.01)
*G06F 11/00* (2006.01)

(52) U.S. Cl. ......... 717/168; 717/170; 717/174; 713/187

(58) Field of Classification Search ...................... None
See application file for complete search history.

(56) References Cited

U.S. PATENT DOCUMENTS

| | | | |
|---|---|---|---|
| 6,675,258 B1 | 1/2004 | Bramhall et al. | |
| 6,971,093 B1 * | 11/2005 | Spring | 717/170 |
| 7,203,723 B2 | 4/2007 | Ogawa | |
| 7,480,907 B1 * | 1/2009 | Marolia et al. | 717/174 |
| 7,577,848 B2 * | 8/2009 | Schwartz et al. | 713/187 |
| 7,673,299 B2 * | 3/2010 | Bennett et al. | 717/168 |
| 7,805,719 B2 * | 9/2010 | O'Neill | 717/168 |
| 7,984,304 B1 * | 7/2011 | Waldspurger et al. | 713/187 |
| 8,065,671 B1 * | 11/2011 | Beker | 717/168 |
| 2004/0199766 A1 * | 10/2004 | Chew et al. | 713/168 |
| 2006/0174240 A1 * | 8/2006 | Flynn | 717/170 |

(Continued)

FOREIGN PATENT DOCUMENTS

JP 5250170 9/1993

(Continued)

OTHER PUBLICATIONS

Du et al., Mobile agents in distributed network management, Jul. 2003, 6 pages, <http://delivery.acm.org/10.1145/800000/792710/p127-du.pdf>.*

(Continued)

*Primary Examiner* — Thuy Dao
(74) *Attorney, Agent, or Firm* — David W. Victor; Konrad Raynes Davda & Victor LLP

(57) ABSTRACT

Provided are a method, system, and article of manufacture for synchronizing controller firmware download. A master device controller receives a code download and sends the code download to a subordinate device controller. The master device controller requests a subordinate code status from the subordinate device controller indicating a status of the code download at the subordinate device controller and stores the received code download and a master code status for the download. The master device controller receives the subordinate code status from the subordinate device controller and compares the subordinate code status with the master code status to determine whether both are valid and at same code level. The master device controller updates the master code image with the code download and coordinating the update of the code download to the subordinate code image in response to determining that the master and subordinate code status are both valid and at the same code level.

22 Claims, 2 Drawing Sheets

U.S. PATENT DOCUMENTS

2007/0240154 A1* 10/2007 Gerzymisch et al. ......... 717/174

FOREIGN PATENT DOCUMENTS

| JP | 6175899 | 6/1994 |
|---|---|---|
| JP | 7044475 | 2/1995 |
| JP | 8194584 | 7/1996 |
| JP | 10222315 | 8/1998 |
| JP | 2002123398 | 4/2002 |
| JP | 2002278906 | 9/2002 |
| JP | 2006146495 | 6/2006 |
| JP | 2006189973 | 7/2006 |

OTHER PUBLICATIONS

Bill Greene, Agile methods applied to embedded firmware development, 2004, 7 pages, <http://ieeexplore.ieee.org/stamp/stamp.jsp?tp=&arnumber=1359797>.*

"Information Materials for IDS" document from Japanese Office Action dated Sep. 6, 2011 for Application No. 2007-291539, filed Nov. 9, 2007.
English abstract of JP 8194584, filed Jul. 30, 1996 by NEC Corp.
English abstract of JP 6175899, filed Jun. 24, 1994 by Toshiba Corp.
English abstract of JP 10222315, filed Aug. 21, 1998 by NEC Corp.
Document entitled "Information Materials for IDS", dated May 24, 2012 re JPO Office Action dated May 22, 2012 pp. 1.
English machine translation of JP5250170 filed Sep. 28, 1993 by NEC Corp.
English machine translation of JP7044475 filed Feb. 14, 1995 by Canon KK.
English machine translation of JP2002123398 filed Apr. 26, 2002 by Matsushita Electric Ind Co Ltd.
English machine translation of JP2006146495 filed Jun. 8, 2006 by Sony Corp.
English machine translation of JP2006189973 filed Jul. 20, 2006 by Sony Corp.

* cited by examiner

SYNCHRONIZING CONTROLLER FIRMWARE DOWNLOAD

CROSS-REFERENCE TO RELATED APPLICATIONS

This applications claims priority benefits under Title 35, Unites States Code, Section 119(a)-(d) or Section 365(b) of United Kingdom Patent Application No. GB0623933.9, filed on Nov. 29, 2006, by Gordon J. COCKBURN And David James MEDHURST, and entitled "APPARATUS AND METHOD FOR SYNCHRONIZING CONTROLLER FIRMWARE DOWNLOAD", which application is incorporated herein by reference in its entirety.

FIELD OF THE INVENTION

The present invention relates to technology for managing device controllers, and more particularly to managing synchronization between the cards of a dual-card controller.

BACKGROUND

In many modern device controllers, two identical controller cards are used so that, if one card fails, the controller can continue to operate using the remaining "good" card.

Typically, in dual-card controller systems, each card is controlled by a microprocessor, and communicates with the other card, as well as with a host system and the device or devices to be controlled. Although the firmware on the two different controller cards will typically be at the same level, there is no guarantee that this will be the case, and all new versions of the firmware must support the communication protocol of the previous versions. This requirement to support the communication protocol of all previous levels of firmware places major restrictions on changes to the communication protocol. This is clearly disadvantageous in increasing the complexity of the task of upgrading the firmware code and in increasing the requirement for space in the controller card memory for storing the firmware code.

Today, on conventional dual-card controllers (typically, SCSI Enclosure Services, or SES cards) according to the art, there are three areas of erasable, programmable read-only memory, known as an EPROM (or "flash memory") containing firmware:
1. The boot area (executed immediately after reset);
2. Image 1 (The main code image which is executed); and
3. Image 2 (Download area for the new main image)

A download is typically performed as follows:
1. The host system sends packets of code data to a controller card, which burns them in Image 2 area of the flash memory as they are received;
2. The host then commands the controller card to 'commit' the code—this involves verifying that the Image 2 area has been downloaded correctly and has a valid checksum; and
3. Assuming step 2 is successful, the host system resets the controller card and the boot code will find that there is new code in Image 2 and so copy it over the code in Image 1 and execute it.

The disadvantage of this conventional method is that there is no synchronization between the cards of the dual-card controller to ensure that both are updated at the same time. It would be advantageous to provide a technical means to avoid the situation in which different levels of firmware need to communicate with each other.

SUMMARY

Provided are a method, system, and article of manufacture for synchronizing controller firmware download. A master device controller receives a code download and sends the code download to a subordinate device controller. The master device controller requests a subordinate code status from the subordinate device controller indicating a status of the code download at the subordinate device controller and stores the received code download and a master code status for the download. The master device controller receives the subordinate code status from the subordinate device controller and compares the subordinate code status with the master code status to determine whether both are valid and at same code level. The master device controller updates the master code image with the code download and coordinating the update of the code download to the subordinate code image in response to determining that the master and subordinate code status are both valid and at the same code level.

BRIEF DESCRIPTION OF THE DRAWINGS

Embodiments are described, by way of example only, with reference to the accompanying drawing figures, in which.

DETAILED DESCRIPTION

Figure 1:
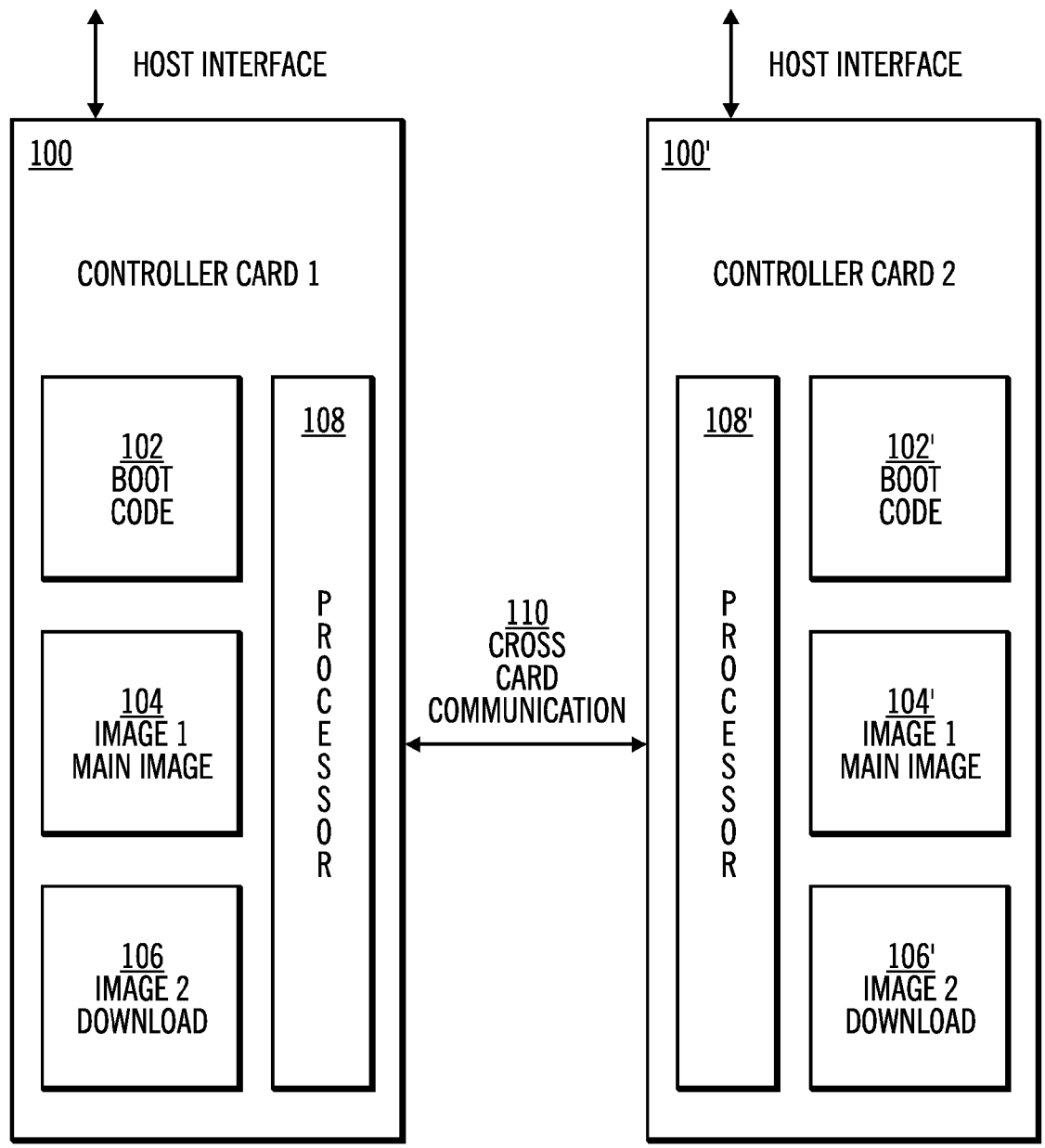
FIG. 1 shows in schematic form an apparatus, or an arrangement of apparatus, in accordance with an embodiment.

The described embodiments include an apparatus for managing a device controller being designated as master and operable to communicate with a second device controller being designated as subordinate and with a host device, comprising: a communication component at said master for receiving a code download from said host device, for sending said code download to said subordinate and for requesting a subordinate code status from said subordinate; a storage component at said master for storing said code download and a master code status for said download; a status management component at said master for receiving said subordinate code status, for comparing said subordinate code status with said master code status and for determining whether or not to update code at said master; and an update manager at said master responsive to a positive determination by said status management component at said master for causing an update of code at said master to coordinate code at said master with code at said subordinate.

In a further embodiment, there is provided an apparatus for managing a device controller being designated as subordinate and operable to communicate with a second device controller being designated as master and with a host device, comprising: a communication component at said subordinate for receiving a code download from said master, for sending a subordinate code status to said master, and for receiving said master code status from said master; a storage component at said subordinate for storing said code download and said master code status; a status management component at said subordinate for determining said subordinate code status, for comparing said subordinate code status with said master code status and for determining whether or not to update code at said subordinate; and an update manager at said subordinate responsive to a positive determination by said status management component at said subordinate for causing an update of code at said subordinate to coordinate code at said subordinate with code at said master.

In a further embodiment, a negative determination by said status management component at said master causes said master to use a previous code level.

In a further embodiment, a negative determination by said status management component at said master causes said subordinate to use a previous code level.

In a further embodiment, said master and said subordinate comprise SES controller cards.

In a further embodiment, said master and said subordinate comprise a redundant pair of controllers.

In a further embodiment, said master code status comprises a verification check of said code download.

In a further embodiment, said subordinate code status comprises a verification check of said code download.

In a further embodiment, verification check comprises a checksum check.

In a further embodiment, there is provided a method for managing a device controller being designated as master and operable to communicate with a second device controller being designated as subordinate and with a host device, comprising the steps of: receiving, by a communication component at said master, a code download from said host device, sending said code download to said subordinate and requesting a subordinate code status from said subordinate; storing, by a storage component at said master, said code download and a master code status for said download; receiving, by a status management component at said master, said subordinate code status, for comparing said subordinate code status with said master code status and for determining whether or not to update code at said master; and responsive to a positive determination by said status management component at said master, causing by an update manager at said master an update of code at said master to coordinate code at said master with code at said subordinate.

In a further embodiment, there is provided a method for managing a device controller being designated as subordinate and operable to communicate with a second device controller being designated as master and with a host device, comprising: receiving, by a communication component at said subordinate, a code download from said master, sending a subordinate code status to said master, for receiving said master code status from said master; storing, by a storage component at said subordinate, said code download and said master code status; determining, by a status management component at said subordinate, said subordinate code status, comparing said subordinate code status with said master code status for determining whether or not to update code at said subordinate; and responsive to a positive determination by said status management component at said subordinate, causing by an update manager at said subordinate an update of code at said subordinate to coordinate code at said subordinate with code at said master.

In a further embodiment, a negative determination by said status management component at said master causes said master to use a previous code level.

In a further embodiment, a negative determination by said status management component at said master causes said subordinate to use a previous code level.

In a further embodiment, said master and said subordinate comprise SES controller cards.

In a further embodiment, said master and said subordinate comprise a redundant pair of controllers.

In a further embodiment, said master code status comprises a verification check of said code download.

In a further embodiment, said subordinate code status comprises a verification check of said code download.

In a further embodiment, said verification check comprises a checksum check.

In a further embodiment, there is provided a data carrier having functional data thereon, said functional data comprising functional computer data structures to, when loaded into a computer system and operated upon thereby, enable said computer system to perform all the steps of a method according to either the third or the fourth aspect.

In a further embodiment, there is provided a computer program comprising computer program code to, when loaded into a computer system and executed thereon, cause said computer system to perform all the steps of a method according to either the third or the fourth aspect.

The described embodiments provide an advantageous technical framework for updating both controller cards to a new code level at the same time in a synchronised manner. This technique avoids code incompatibility problems by ensuring that the controller cards do not try to interact with each other until they have both installed the new code level.

One embodiment is implemented in a dual-card device controller system.

In FIG. 1 is shown a dual-card device controller system comprising a pair of controller cards 100, 100', each having boot code 102, 102'. Each controller further comprises an image 1 area 104, 104' for storing the main code image, and an image 2 area 106, 106' for storing a download image. Each controller further comprises a processor 108, 108' for executing code from its respective image 1 area 104, 104', responsive to initiation by its respective boot code 102, 102'. The code images in image area 1 104,104' and image area 2 106, 106' may have an associated code level, which may comprise, for example, a release or version level of the code. Controller cards 100, 100' are operatively coupled for intercommunication by a cross-card communication channel 110, which may take any of a number of forms well known to those of ordinary skill in the art. Each of controller cards 100, 100' may be operatively coupled to a host system via a host interface.

Preferred embodiments may be in the form of an apparatus or arrangement of apparatus advantageously addresses the problem of providing a technical framework for managing device controllers, and more particularly to managing the cards of a dual-card controller.

Figure 2:
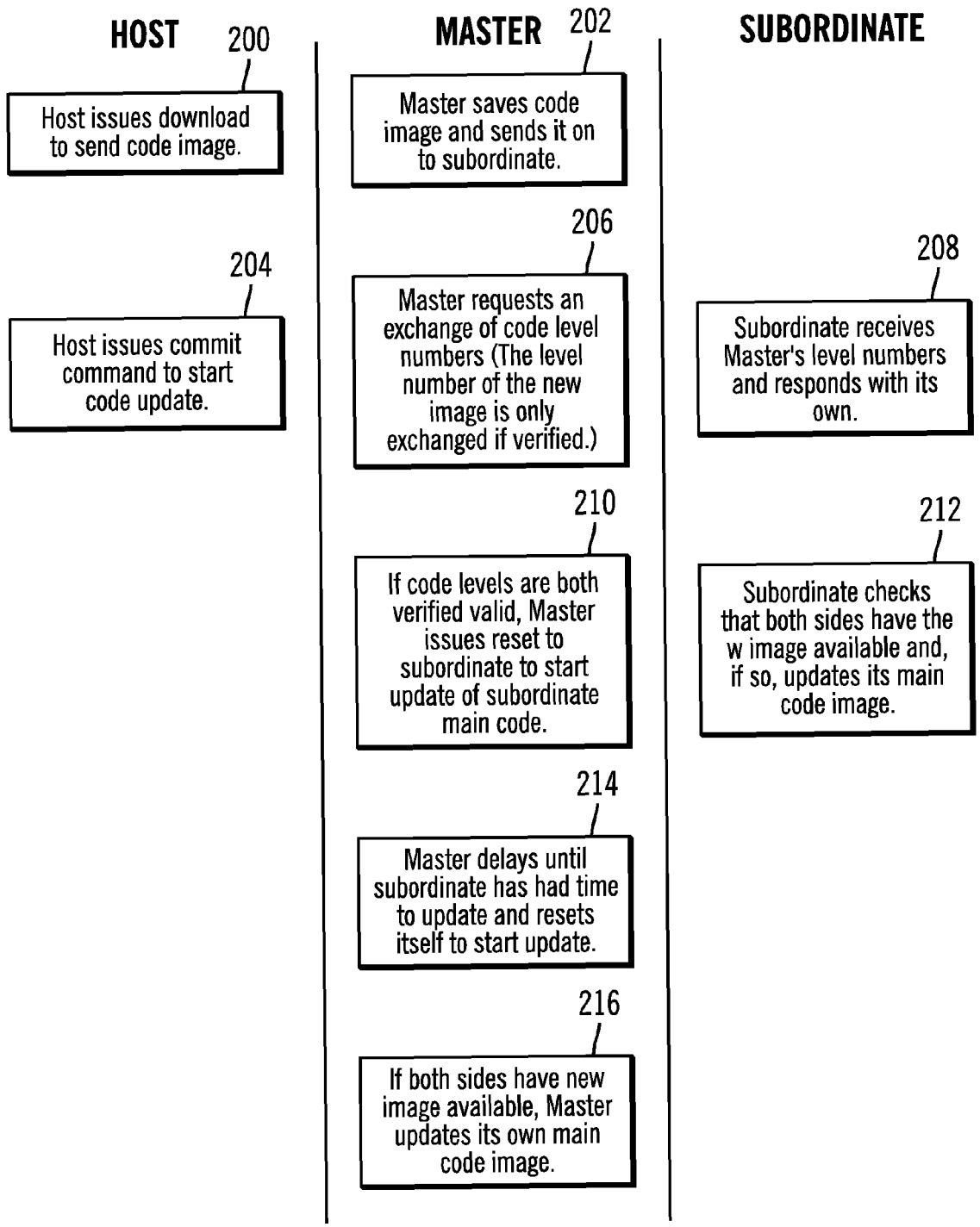
FIG. 2 shows in schematic form one method or one logic arrangement in which a method of operation according to an embodiment may be implemented.

FIG. 2 shows a generalized process flow according to an embodiment. FIG. 2 is divided into three columns to represent actions performed respectively by the host, a card which has been elected to act as the master, and a card that has been elected to act as the subordinate. The election of master and subordinate controller cards, as between the controller cards 100, 100' of FIG. 1, is a process that is well understood by those of ordinary skill in the art, and thus need not be further described here, except to indicate that, as the cards of the exemplary embodiment are identical, either card could serve in either role. In alternative arrangements, wherein the cards may differ in their functionality, one or other of the pair of cards may always be chosen as master and the other as subordinate.

In FIG. 2, then, at step 200, the host issues a download command to send a new code image to the master, and at step 202, the master receives the download, saves the code image in its image 2 area and sends it on to the subordinate. At step 204, the host issues a commit command to start the code update process, and the master responds to the commit command by requesting an exchange of code level numbers with the subordinate. At step 208, the subordinate receives the master's level numbers and responds with its own. The level number of the new code image for either side is only exchanged if the code has been verified as valid, by means of, for example, testing the code using a checksum or the like. For example, a checksum may be tested after the code image has been downloaded to ensure that the code has not been corrupted during transmission. At step 210, if the code levels are both verified as valid, the master issues a reset to the subordinate to start the update process for the code at the subordinate, and at step 212, the subordinate checks that both sides have the new code image available and, if so, updates its main code image and is ready to execute the new code. At step 214, the master waits for a period during which the subordinate has had time to complete its update, and then resets itself to start the update to its main code image. At step 216, the master checks that both sides have the new code image available and updates its own main code image. At this stage, the master is ready to execute the new code.

An SES controller code download process according to a preferred embodiment is thus: The host system sends packets of code data to a 'master' SES card, which forwards them to the other 'subordinate' SES card. Both SES cards burn the code packets in image 2 area of the flash as the code is received. The system then issues a 'commit', as before. The scheme relies on both sides knowing which code levels are in both images of both cards, so the cards have to exchange this information on the communications link.

Using this information from the subordinate, and the knowledge about its own image, the master SES card then verifies that the image2 in both cards is valid. If both images are valid, then the master forces the subordinate SES card to reset itself in order to adopt the new code. The card which is being reset must have saved the information about the partner's code levels in memory which is preserved across the reset. In an alternative embodiment, the boot code has the function required to query this information, which would mean having a small subset of communication which would have to work on all code levels).

If the boot code in the card being reset finds that its own image 2 has a new image, and that the partner card also has that code level in either of its two images, then it will copy image 2 to image 1 and start executing it. If this is not the case, image 1 will be executed. After waiting a suitable period to avoid both SES cards resetting simultaneously, which could cause an unacceptable loss of access to Fibre Channel devices, the master SES card resets itself to adopt the new code. The steps of checking the code levels and executing the appropriate code apply to the master's reset as well as the subordinate's. After coming out of reset with the new code level, each SES card will avoid interacting with the other until both are deemed to be operating at the same 'interface level'.

This could be achieved, for example, by each card checking that the partner's 'interface level' is compatible with its own, after coming out of reset. If the levels are not compatible, no further interaction with the partner is permitted.

In a further refinement, extra function may be introduced to handle the case where a card is removed, and replaced with one which has a different code level on it. In such a case the card which has just been replaced should enter a state where it does not do anything but wait for a download of a new code level.

The method of described embodiments requires that the boot code has a means of knowing the state of the partner card and which code level it is running. The easiest way to meet this requirement is to define a very small subset of the communication protocol which will be supported by all code levels. It would be reasonable, for example, to support one message that communicated the controller state, including code levels. It would also be reasonable to support a download command to give the possibility of download across the cross card interface, although download may, in an alternative, be initiated directly from the host system.

The described embodiment in the form of a method or logic arrangement thus advantageously addresses the problem of providing a technical framework for managing device controllers, and more particularly to managing synchronization between the cards of a dual-card controller.

It will be clear to one of ordinary skill in the art that all or part of the method of the embodiments may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors, and that the software may be provided in the form of one or more computer program elements carried on any suitable data-carrier (not shown in the figures) such as a magnetic or optical disk or the like. Channels for the transmission of data may likewise comprise storage media of all descriptions as well as signal-carrying media, such as wired or wireless signal-carrying media.

The described embodiments may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the described embodiments may be realized in the form of computer implemented method of deploying a service comprising steps of deploying computer program code operable to, when deployed into a computer infrastructure and executed thereon, cause said computer system to perform all the steps of the method.

It will be clear to one skilled in the art that many improvements and modifications can be made to the foregoing exemplary embodiment without departing from the scope of the present invention.

The invention claimed is:

1. An method, comprising:
receiving, by a master device controller including a first processor, a code download;
sending, by the master device controller, the code download to a subordinate device controller including a second processor;
requesting, by the master device controller, a subordinate code status from the subordinate device controller indicating a status of the code download at the subordinate device controller;
storing, by the master device controller, the received code download and a master code status for the download;
receiving, by the master device controller, the subordinate code status from the subordinate device controller;
comparing, by the master device controller, the subordinate code status with the master code status to determine whether both are valid and at a same code level; and
updating, by the master device controller, a master code image with the code download and coordinating the update of the code download to a subordinate code image in response to determining that the master and subordinate code status are both valid and at the same code level.

2. The method of claim 1, further comprising:
receiving, by the subordinate device controller, the code download from the master device controller;
sending, by the subordinate device controller, the subordinate code status to the master device controller; and
receiving, by the subordinate device controller, the master code status from the master device controller.

3. The method of claim 2, further comprising:
comparing the subordinate code status with the master code status to determine whether both are valid and at the same code level; and
updating the subordinate code image with the code download in response to determining that the both the subordinate and master code statuses are valid and at the same code level.

4. The method of claim 1, wherein the operations performed by the subordinate device controller to coordinate the update of the code download to the subordinate code image further comprise:
sending a reset to the subordinate device controller to cause the subordinate device controller to update the subordinate code image with the code download.

5. The method of claim 4, wherein the subordinate device controller updates the subordinate code image with the code download in response to receiving the reset and in response to determining that the both the subordinate and master code statuses are valid and at the same code level.

6. The method of claim 4, wherein the master device controller updates the master code image with the code download in response to waiting a period of time to provide the subordinate device controller time to update the subordinate code image with the code download.

7. A system, comprising:
a master device controller, including a first processor, executing a master main code image;
a subordinate device controller, including a second processor, in communication with the master device controller executing a subordinate main code image;
wherein the master device controller implements at least one of logic and software to perform operations, the operations comprising:
receiving a code download;
sending the code download to the subordinate device controller;
requesting a subordinate code status from the subordinate device controller indicating a status of the code download at the subordinate device controller;
storing the received code download and a master code status for the download;
receiving the subordinate code status from the subordinate device controller;
comparing the subordinate code status with the master code status to determine whether both are valid and at a same code level; and
updating the master code image with the code download and coordinating the update of the code download to the subordinate code image in response to determining that the master and subordinate code status are both valid and at the same code level.

8. The system of claim 7, wherein the subordinate device controller implements at least one of logic and software to perform operations, the operations comprising:
receiving the code download from the master device controller;
sending the subordinate code status to the master device controller; and
receiving the master code status from the master device controller.

9. The system of claim 8, wherein the operations performed by the subordinate device controller further comprise:
comparing the subordinate code status with the master code status to determine whether both are valid and at the same code level; and
updating the subordinate code image with the code download in response to determining that the both the subordinate and master code statuses are valid and at the same code level.

10. The system of claim 9, wherein the master and subordinate device controllers do not update the master and subordinate code images with the code download in response to determining that at least one of the subordinate and master code statuses are not valid or at the same code level.

11. The system of claim 7, wherein the operations performed by the subordinate device controller to coordinate the update of the code download to the subordinate code image further comprise:
sending a reset to the subordinate device controller to cause the subordinate device controller to update the subordinate code image with the code download.

12. The system of claim 11, wherein the subordinate device controller updates the subordinate code image with the code download in response to receiving the reset and in response to determining that the both the subordinate and master code statuses are valid and at the same code level.

13. The system of claim 11, wherein the master device controller updates the master code image with the code download in response to waiting a period of time to provide the subordinate device controller time to update the subordinate code image with the code download.

14. The system of claim 13, wherein the master device controller updates the master code image with the code download in response to waiting the period of time and in response to determining that both the master and subordinate device controller have the code download available.

15. An article of manufacture comprising at least one computer readable medium comprising hardware implemented in a master device controller and in a subordinate device controller to cause the master and subordinate device controllers to perform operations, the operations comprising:
- receiving, by the master device controller, a code download;
- sending, by the master device controller, the code download to the subordinate device controller;
- requesting, by the master device controller, a subordinate code status from the subordinate device controller indicating a status of the code download at the subordinate device controller;
- storing, by the master device controller, the received code download and a master code status for the download;
- receiving, by the master device controller, the subordinate code status from the subordinate device controller;
- comparing, by the master device controller, the subordinate code status with the master code status to determine whether both are valid and at a same code level; and
- updating, by the master device controller, a master code image with the code download and coordinating the update of the code download to a subordinate code image in response to determining that the master and subordinate code status are both valid and at the same code level.

16. The article of manufacture of claim 15, wherein the operations further comprise:
- receiving, by the subordinate master device controller, the code download from the master device controller;
- sending, by the subordinate device controller, the subordinate code status to the master device controller; and
- receiving, by the subordinate device controller, the master code status from the master device controller.

17. The article of manufacture of claim 16, wherein the operations further comprise:
- comparing the subordinate code status with the master code status to determine whether both are valid and at the same code level; and
- updating the subordinate code image with the code download in response to determining that the both the subordinate and master code statuses are valid and at the same code level.

18. The article of manufacture of claim 17, wherein the master and subordinate device controllers do not update the master and subordinate code images with the code download in response to determining that at least one of the subordinate and master code statuses are not valid or at the same code level.

19. The article of manufacture of claim 15, wherein the operations performed by the subordinate device controller to coordinate the update of the code download to the subordinate code image further comprise:
- sending a reset to the subordinate device controller to cause the subordinate device controller to update the subordinate code image with the code download.

20. The article of manufacture of claim 19, wherein the subordinate device controller updates the subordinate code image with the code download in response to receiving the reset and in response to determining that the both the subordinate and master code statuses are valid and at the same code level.

21. The article of manufacture of claim 19, wherein the master device controller updates the master code image with the code download in response to waiting a period of time to provide the subordinate device controller time to update the subordinate code image with the code download.

22. The article of manufacture of claim 21, wherein the master device controller updates the master code image with the code download in response to waiting the period of time and in response to determining that both the master and subordinate device controller have the code download available.

* * * * *